(12) United States Patent
Chien et al.

(10) Patent No.: US 10,031,364 B2
(45) Date of Patent: Jul. 24, 2018

(54) POLYMER-DISPERSED BLUE-PHASE LIQUID CRYSTAL FILMS

(71) Applicants: Liang-Chy Chien, Hudson, OH (US); Jeoung-Yeon Hwang, Kent, OH (US); Emine Kemiklioglu, Kent, OH (US)

(72) Inventors: Liang-Chy Chien, Hudson, OH (US); Jeoung-Yeon Hwang, Kent, OH (US); Emine Kemiklioglu, Kent, OH (US)

(73) Assignee: Kent State University, Kent, OH (US)

(*) Notice: Subject to any disclaimer, the term of this patent is extended or adjusted under 35 U.S.C. 154(b) by 55 days.

(21) Appl. No.: 14/950,384

(22) Filed: Nov. 24, 2015

(65) Prior Publication Data

US 2016/0085095 A1 Mar. 24, 2016

Related U.S. Application Data

(63) Continuation-in-part of application No. PCT/US2014/044112, filed on Jun. 25, 2014.

(60) Provisional application No. 62/083,483, filed on Nov. 24, 2014, provisional application No. 61/839,047, filed on Jun. 25, 2013.

(51) Int. Cl.
| | |
|---|---|
| *G02F 1/1334* | (2006.01) |
| *G02F 1/137* | (2006.01) |
| *C09K 19/02* | (2006.01) |
| *C09K 19/54* | (2006.01) |
| *G02F 1/1343* | (2006.01) |

(52) U.S. Cl.
CPC ........ *G02F 1/1334* (2013.01); *C09K 19/0275* (2013.01); *C09K 19/544* (2013.01); *G02F 1/137* (2013.01); *G02F 1/134363* (2013.01); *G02F 2001/13756* (2013.01); *G02F 2001/13793* (2013.01)

(58) Field of Classification Search
CPC ... G02F 1/1334; G02F 1/137; C09K 19/0275; C09K 19/544
See application file for complete search history.

(56) References Cited

U.S. PATENT DOCUMENTS

| | | |
|---|---|---|
| 5,216,530 A | 6/1993 | Pearlman et al. |
| 2005/0162606 A1 | 7/2005 | Doane et al. |
| 2007/0080370 A1* | 4/2007 | Miyachi .............. G02F 1/13624 257/107 |
| 2012/0162596 A1* | 6/2012 | Chen ................. G02F 1/133703 349/199 |
| 2012/0249928 A1 | 10/2012 | Kaihoko et al. |
| 2013/0070193 A1 | 3/2013 | Kilickiran et al. |

* cited by examiner

*Primary Examiner* — James Dudek
(74) *Attorney, Agent, or Firm* — Renner Kenner Greive Bobak Taylor & Weber Co. LPA

(57) ABSTRACT

A polymer-dispersed blue-phase (PDBP) liquid crystal film is formed from a polymer-based latex and blue-phase liquid crystals that are combined using an emulsification process or a polymerization-induced phase separation process. The resultant PDBP liquid crystal film includes droplets formed by the polymer-based latex that encapsulate the blue-phase liquid crystals therein, so as to allow the blue-phase liquid crystals to have a blue phase at room temperature. As such, the PDBP liquid crystal film is conducive for use in manufacturing processes, such as LCD (liquid crystal display) manufacturing processes, while providing desirable optical features, such as field-induced birefringence at low switching voltages.

14 Claims, 15 Drawing Sheets

POLYMER-DISPERSED BLUE-PHASE LIQUID CRYSTAL FILMS

CROSS-REFERENCE TO RELATED APPLICATIONS

This application claims the benefit of U.S. Provisional Application No. 62/083,483 filed on Nov. 24, 2014, and is a continuation-in-part of International Patent Application No. PCT/US2014/044112, filed on Jun. 25, 2014, which claims the benefit of U.S. Provisional Application No. 61/839,047 filed on Jun. 25, 2013, the content each of which is incorporated herein by reference.

TECHNICAL FIELD

The present invention relates to liquid crystal materials. In particular, the present invention relates to blue-phase liquid crystal dispersions that are encapsulated in polymer droplets. More particularly, the present invention relates to polymer-dispersed blue-phase (PDBP) liquid crystal films, in which the polymer encapsulated blue-phase liquid crystal droplets have a blue phase at room temperature.

BACKGROUND OF THE INVENTION

Blue-phase liquid crystals (BPLC) are locally-isotropic fluids in which the liquid crystal molecules organize themselves into complex three-dimensional (3D) structures that are characterized by crystallographic space group symmetry, whereby the blue-phase liquid crystals form double-twisted cylinders that are separated by defect lines. Specifically, as temperature increases, blue-phase liquid crystals enter one of these blue-phase (BP) network states, which are identified as: BP I, II and III. The blue-phase liquid crystals in the BP I and BP II network states, as shown in FIGS. 1A and 1B respectively, form soft, frequently coagulating platelet-domains, which are micrometer to sub-millimeter in size. Blue-phase liquid crystals in the BP I network state have a Bravis lattice that is body-centered, while the liquid crystals in the BP II network state have a Bravis lattice that is a simple cubic. However, blue-phase liquid crystals in the BP III network state have a cloudy and amorphous appearance, which is referred to as "blue fog", whereby light is selectively reflected, with light-scattering vectors forming a reciprocal Bravis lattice of a cubic periodic system.

As such, blue-phase liquid crystal (BPLC) materials have the potential to serve as a next-generation liquid crystal display (LCD) material due to their desirable operating features, which include field-induced birefringence, fast response or switching time between light-scattering and light-transmitting states, which may be in the sub-millisecond range, and that is at least one order of magnitude faster than that attained by current nematic liquid crystal (NLC) type displays. Blue-phase liquid crystals are also desirable materials for LCD displays, as blue-phase liquid-crystal based devices and materials do not require a surface-alignment layer, which is normally required in standard LCD displays. As a result, the fabrication process of blue-phase liquid-crystal based LCDs and other devices is greatly simplified, and as a result, time and manufacturing costs are reduced.

Polymer-dispersed liquid crystals (PDLCs) are a class of optical materials that can be prepared by polymerization or through solvent evaporation-induced phase separation. PDLCs typically include micron-sized liquid crystal droplets that are encapsulated in matrices of optically transparent polymers. Specifically, the liquid crystal molecules nucleate and form droplets with a disparity in size and shape that depends on the particular attributes of the phase-separation process used, such as the rate of polymer gelation, for example. Thus, at zero-applied voltage, the indices of refraction between the polymer and the liquid crystal molecules are mismatched, causing the phase-separated PDLC film to normally appear milky and scatter incident ambient light. As a result, PDLC-based films can be switched from a light-scattering state to a light-transparent state or vice versa in response to an applied voltage. Compared to conventional nematic liquid crystal (NLC) type displays and devices, PDLC devices have many advantages, including high light transmittance and the lack for the need of polarizers and alignment films. Additional advantages of blue phase liquid crystals (BPLCs) include field-induced birefringence due to their sub-millisecond response time, which is at least one order of magnitude faster than the present nematic liquid crystal (NLC) based displays. Another significant advantage of BPLCs is their wide and symmetric viewing angle due to the fact that their "voltage off" state is optically isotropic and the "voltage on" state forms multidomain structures. Consequently, PDLC devices have been used in broad applications, ranging from switchable light modulators and smart windows to information displays, switchable lenses and holographically-formed optical elements and devices, for example.

Thus, it would be desirable to incorporate blue-phase liquid crystals (BPLC) into a polymer-dispersed liquid crystal (PDLC) material to form a polymer-dispersed blue-phase (PDBP) liquid crystal material, such as a film, which incorporates the benefits of typical PDLC materials (high light transmittance, lack of need of polarizers and alignment films) with that of blue-phase (BP) liquid crystals (field-induced birefringence, fast-response/switching time between light-scattering and light-transmitting states at low voltage levels). However, manufacturing such PDBP materials is made difficult in part due to the inability of the blue-phase liquid crystals to achieve their blue phase at room temperature. That is, blue phases, (i.e. the self-organized three-dimensional structures formed by double-twisted cylinders of cholesteric liquid crystals LCs), appear only in a narrow temperature range between the chiral nematic (cholesteric) and isotropic phases. Thus, the inherent narrow blue phase temperature range is one of the most significant limitations restricting the potential applications of blue phase liquid crystals. One of the methods used to enlarge the blue phase temperature range is the stabilization of the defects by polymerizing a small amount of reactive monomers in the defect regions approximately around 3 volume % to 5 volume % of the cubic lattice, wherein polymerized reactive monomer molecules forms polymer network within the disclination core and stabilize the appearance of liquid crystal blue phase for wide temperature range. There is no encapsulation of the blue phase liquid crystal and no continuous phase of the polymer.

Therefore, there is a need for a polymer-dispersed blue-phase (PDBP) liquid crystal material, such as a film that achieves its blue phase at room temperature to facilitate its fabrication and its use in various devices, such as optical retardation films, switchable light shutters, LCD display devices, and the like. Furthermore, there is a need for a polymer-dispersed blue-phase (PDBP) liquid crystal material, such as a film that is compatible for use in an electro-optical cell, such as an IPS (in-plane switching) cell, that utilizes flexible or drapeable substrates that may be mechanically flexed, bent, or deformed. Moreover, there is a need for a polymer-dispersed blue-phase (PDBP) liquid crystal material, such as a film, that has high light transmittance, lacks the need for use of polarizers and alignment films, allows field-induced birefringence, and provides fast-response/switching times between light-scattering and light-transmitting states. In addition, there is a need for a polymer-dispersed blue-phase (PDBP) liquid crystal material, such as a film, that is compatible for use with a continuous fabrication processes used to manufacture optical devices, such as LCD displays.

SUMMARY OF THE INVENTION

In light of the foregoing, it is a first aspect of the present invention to provide an electro-optical cell, and electro-optical cell comprising a first at least partially-transparent substrate; a second at least partially-transparent substrate; a light-control layer disposed between and first and second at least partially-transparent substrates, and light-control layer comprising a mixture of a polymer-based latex and a plurality of blue-phase liquid crystals to form an emulsion thereof, such that and polymer-based latex forms a plurality of droplets, such that at least one of and plurality of droplets encapsulate one or more of and plurality of blue-phase liquid crystals; and a first and a second at least partially-transparent electrode disposed on and first at least partially-transparent substrate, and electrodes spaced from each other and positioned adjacent to and light-control layer, wherein when a first voltage is applied across and electrodes, and light control is placed in a light-scattering state, and when a second voltage is applied across and electrodes, and light-control layer is placed in an at least partially light-transparent state.

It is a further aspect of the present invention to provide a method of forming an electro-optical cell comprising preparing a mixture of a plurality of blue-phase liquid crystals and a polymer-based latex; shaking and mixture; stirring and mixture in an ultrasonic bath at room temperature to form an emulsion, whereby and polymer-based latex forms a plurality of droplets, such that at least one and plurality of droplets encapsulates one or more of and plurality of blue phase crystals therein; and disposing and emulsion between a pair of spaced at least partially-transparent substrates to form a light-control layer, such that at least one of and substrates includes a pair of spaced at least partially-transparent electrodes thereon adjacent to and light-control layer.

It is yet another aspect of the present invention to provide a method of forming an electro-optical cell comprising preparing a mixture of a photopolymerizable monomer, a photoinitiator, and a plurality of blue-phase liquid crystals; stirring and mixture; disposing and stirred mixture between a pair of spaced at least partially-transparent substrates to form a light-control layer, such that at least one of and substrates includes a pair of spaced at least partially-transparent electrodes thereon adjacent to and light-control layer; and exposing and mixture to UV (ultraviolet) light, whereby and photopolymerizable monomer forms a plurality of droplets, such that at least one of and plurality of droplets encapsulates one or more of and plurality of blue phase crystals therein.

It is another aspect of the present invention to provide blue phase liquid crystals, which include a nematic blue phase liquid crystal, a reactive monomer, and a small quantity of a photoinitiator are mixed with a latex solution, so that upon polymerization, an encapsulated blue phase liquid crystal droplets, containing at least partially cross-linked polymers therein are formed wherein the formed latex polymer constitutes a continuous phase. The encapsulated blue phase liquid crystals are for use as encapsulated LC films due to their unique electro-optical properties, no alignment layers, i.e. free thereof, and field-induced birefringence and fast switching properties. With polymer stabilization of the BPLC, the blue phase temperature range of polymer stabilized blue phase polymer dispersion materials is greatly broadened and is suitable for a wide range of applications.

It is another aspect of the present invention to provide a polymer stabilized blue phase liquid crystal dispersion, which includes a continuous polymer phase; a stabilized, at least partially crosslinked nematic blue phase liquid crystal dispersed and encapsulated within the continuous polymer phase; and the blue phase liquid crystal being in the form of liquid droplets.

It is yet another aspect of the present invention to provide a process for making a polymer stabilized blue phase liquid crystal dispersion, which includes the steps of: forming a solution comprising a nematic blue phase liquid crystal, at least one crosslinking monomer, and a photoinitiator; mixing the liquid crystal solution with a latex forming solution comprising monomers capable of forming a polymer, water, and a surfactant; mixing the blue phase liquid crystal solution and the latex solution and polymerizing the same and forming blue phase liquid crystal droplets containing a stabilized at least partially crosslinked, polymer therein as a discontinuous phase within a continuous phase, of a latex polymer solution.

Still another aspect of the present invention is that a polymer stabilized blue phase liquid crystal dispersion includes a continuous polymer phase; and a stabilized, at least partially cross-linked nematic blue phase liquid crystal material that is dispersed and encapsulated within the continuous polymer phase; wherein the blue phase liquid crystal material is in the form of droplets.

Yet another aspect of the present invention is that a process for making a polymer stabilized blue phase liquid crystal dispersion, comprising the steps of forming a solution comprising nematic blue phase liquid crystals, at least one crosslinking monomer, and a photoinitiator; mixing the liquid crystal solution with a latex to form a solution comprising monomers capable of forming a polymer, water, and a surfactant; and mixing the blue phase liquid crystal solution with the latex solution, and polymerizing the same to form blue phase liquid crystal droplets that contain therein a stabilized, at least partially cross-linked, polymer as a discontinuous phase, wherein the blue phase liquid crystal droplets are disposed within a continuous phase of a latex polymer solution.

BRIEF DESCRIPTION OF THE DRAWINGS

These and other features and advantages of the present invention will become better understood with regard to the following description, appended claims, and accompanying drawings wherein:

DETAILED DESCRIPTION OF THE INVENTION

Figure 1A:
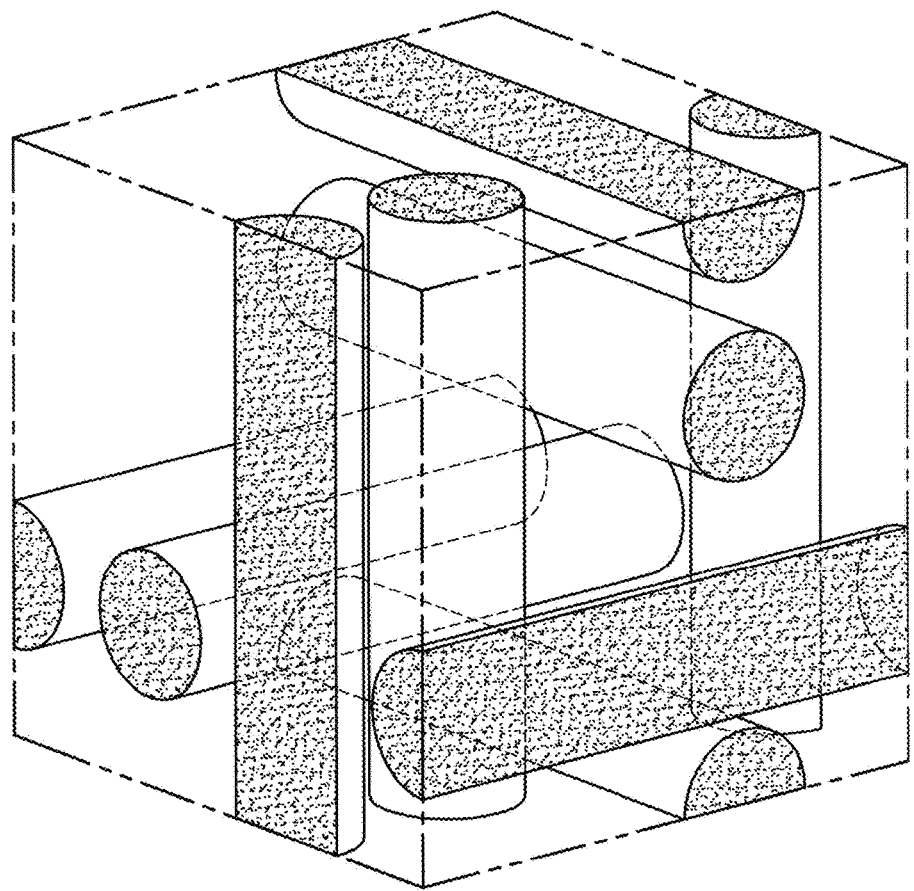
FIG. 1A is a schematic view of blue-phase liquid crystals in blue-phase network state I.
Figure 1B:
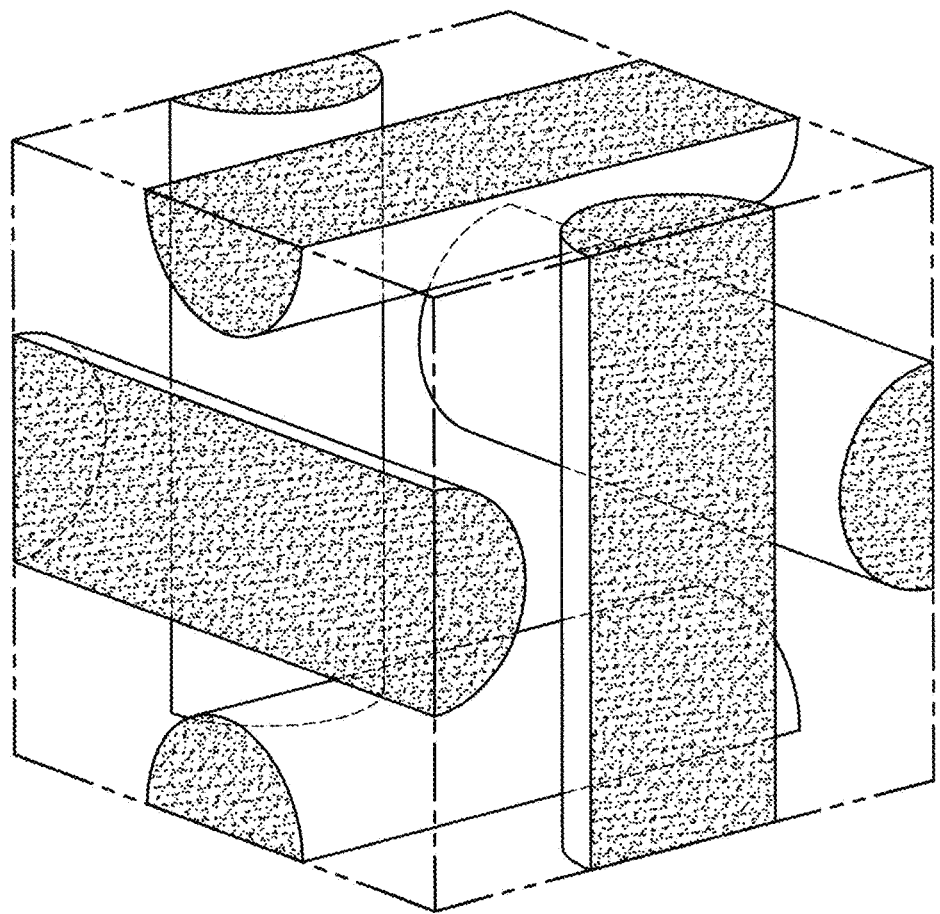
FIG. 1B is a schematic view of blue-phase liquid crystals in blue-phase network state II.
Figure 2:
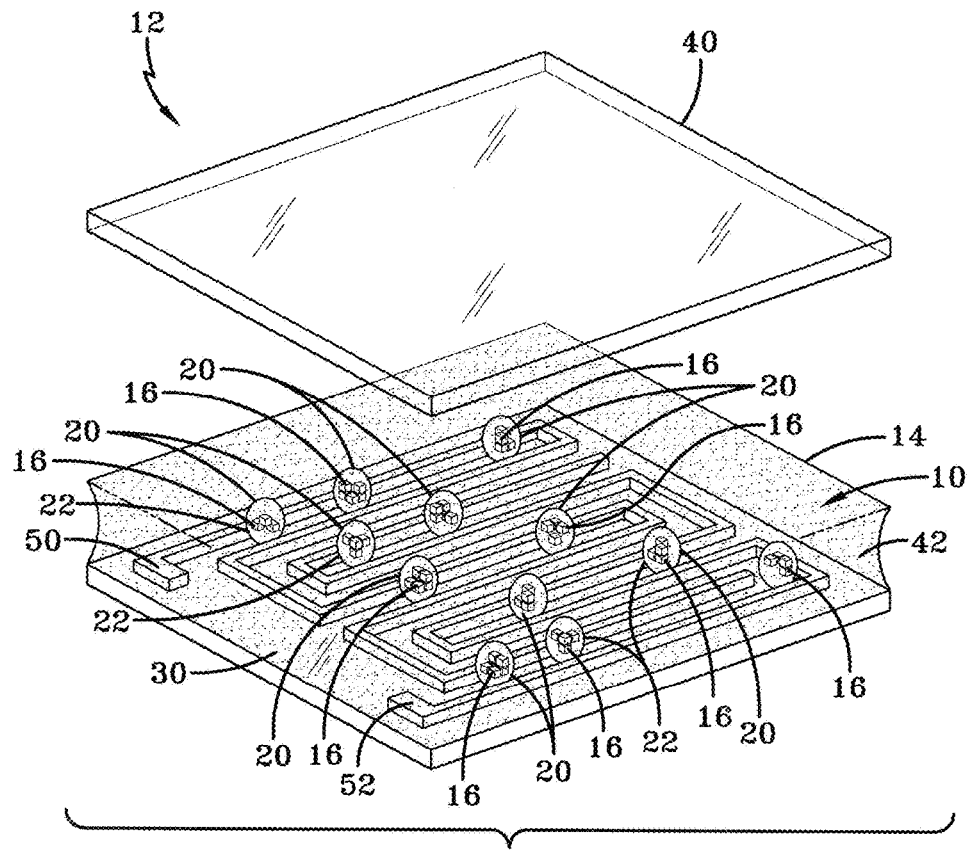
FIG. 2 is an exploded schematic view of an electro-optical cell that includes polymer-dispersed blue-phase (PDBP) liquid crystal material in accordance with the concepts of the present invention.
Figure 2A:
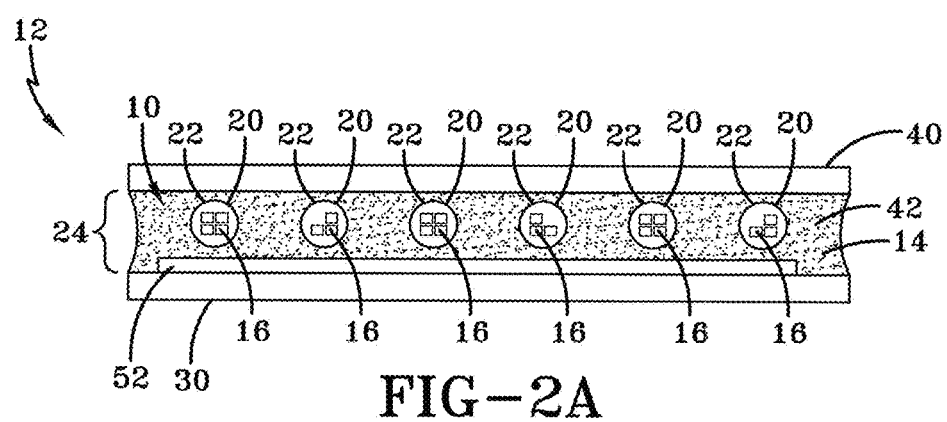
FIG. 2A is a cross-sectional schematic view of the electro-optical cell of FIG. 2 in accordance with the concepts of the present invention.

A polymer-dispersed blue-phase (PDBP) liquid crystal material or film 10, hereinafter referred to as "PDBP material", which is disposed in an electro-optical cell 12 is shown in FIGS. 2 and 2A of the drawings. In particular, the PDBP material 10 forms a film in the electro-optical cell 12 that includes a plurality of polymer encapsulated droplets that contain blue-phase liquid crystals, which will be discussed in detail below. It should also be appreciated that while the following discussion relates to the electro-optical cell 12, a plurality of cells 12 can be organized and coupled together using known techniques to form electro-optical devices of any desired dimension and shape. It should also be appreciated that while the PDBP material 10 may comprise a thin film, the PDBP material 10 may be configured to take on any suitable dimension, including any desired thickness dimension.

Specifically, the PDBP material 10 is formed by an emulsification process, whereby an optically-transparent polymer-based latex 14, such as the polyurethane-based latex NEOREZ 967 or PVA (polyvinyl alcohol), is combined with water and blue-phase liquid crystals (BPLC) 16. However, it should be appreciated that other techniques for preparing the PDBP material 10 may be used.

In one aspect, the blue-phase liquid crystals 16 utilized by the present invention may be formed from a mixture of nematic liquid crystals and chiral dopants. That is, the blue-phase liquid crystals 16 may comprise a cyanobiphenyl-based nematic eutectic mixture with positive dielectric anisotropy and a chiral dopant with a moderate helical twisting power. For example, the blue-phase liquid crystals 16 may be formed as a mixture by weight ratio of about 62% nematic liquid crystal material and about 38% chiral dopant, such as R811 sold by Merck. However, it should be appreciated that other formulations to produce the blue-phase liquid crystals 16 may be used.

Furthermore, the PDBP material 10 formed by the emulsification process contemplated by the present invention may comprise, by weight ratio, about 33% latex 14 and about 67% blue-phase liquid crystals 16. In another aspect, the preferable composition of the emulsified PDBP material 10 comprises a polymer latex concentration from about 15% to 90%, and more preferably, from about 20% to 70%, while the preferable concentration of blue-phase liquid crystals 16 is from about 85% to 10%, and more preferably, from about 80% to 30%.

Furthermore, the PDBP material 10 prepared via the emulsification process may use a polymer-based latex, such as polyvinyl alcohol (PVA) for example, as previously discussed. Thus, in one aspect, the PDBP material 10 may include about 20% PVA, about 3% surfactant, and about 77% blue-phase liquid crystals.

The emulsification process utilized by the present invention to prepare the PDBP material 10 is carried out initially by mixing the polymer-based latex 14, water, and blue-phase liquid crystals 16 in a vortex shaker for approximately three minutes. The emulsification process is then completed by stirring this mixture in an ultrasonic bath at room temperature for approximately two hours. The resulting emulsion forms the PDBP material 10, as shown in FIGS. 2 and 2A, whereby the blue-phase liquid crystals 16 are encapsulated in droplets 20 that are suspended in the polymer-based latex material 14. In other words, the emulsification process creates droplets 20 that are suspended in the polymer-based latex material 14, whereby the polymer-based latex material 14 forms a shell or outer surface 22 of the droplets 20 that contains the blue-phase liquid crystals 16.

Continuing, the PDBP material 10 is disposed in a gap 24, shown in FIG. 2A, formed by the electro-optical cell 12, by filling or other suitable process, whereby the gap 24 is defined as a void disposed between spaced-apart first and second substrates 30,40. That is, the PDBP material 10 forms a film, which serves as a light-control layer 42 that is disposed between the first and the second substrates 30 and 40 of the electro-optical cell 12. It should be appreciated that the first and second substrates 30,40 may be at least partially light transparent. However, in other aspects, one of the substrates 30,40 may be opaque, while the other substrate is at least partially light transparent. In one aspect, the substrate 30 may include electrodes 50 and 52 disposed thereon that are adjacent to the light-control layer 42, while the other substrate 40 does not include any electrodes 50 and 52 disposed thereon. In another aspect, the electrodes 50 and 52 may be interdigitated and/or arranged in a top-down pattern, and may be at least partially light transparent. In another aspect, the electrodes 50,52 may be formed of indium-tin-oxide (ITO), however any suitable material may be used. It should also be appreciated that the substrates 30,40 and/or electrodes 50,52 may be configured to be flexible, bendable, conformable, drapeable, or rigid. In one aspect, the electro-optical cell 12 may comprise an in-plane switching (IPS) optical cell for example. It should also be appreciated that the electrodes 50,52 may have an approximate 10 µm electrode line width, and an approximate 10 µm space between adjacent lines forming the electrodes 50 and 52. However, it should be appreciated that any other suitable dimension may be used with regard to electrode 50,52 line width, and electrode line spacing. Moreover, the electro-optical cell 12 is configured so that the gap 24 may be approximately 22 µm, which may be established by ball spacers, or other suitable component, although the gap 24 may take on any other suitable dimension. Thus, applying a suitable voltage across the electrodes 50,52 allows the PDBP material 12 of the light-control layer 42 to be switched into either of an opaque state (i.e. light-scattering) or a light-transparent state, as well as progressive states therebetween.

To evaluate the influence of the blue-phase liquid crystal droplets 20 on the electro-optical properties of the electro-optical cell 12, the polymer morphology of the PDBP material or film 10 was determined using a scanning electron microscope (SEM) after removal of the blue-phase liquid crystal molecules with organic solvent. Specifically, the electro-optical cell 12 was opened carefully, and the PDBP film 10 was deposited on a thin layer of gold under vacuum to enhance the contrast and resolution of the image generated by the microscope.

Figure 3A:
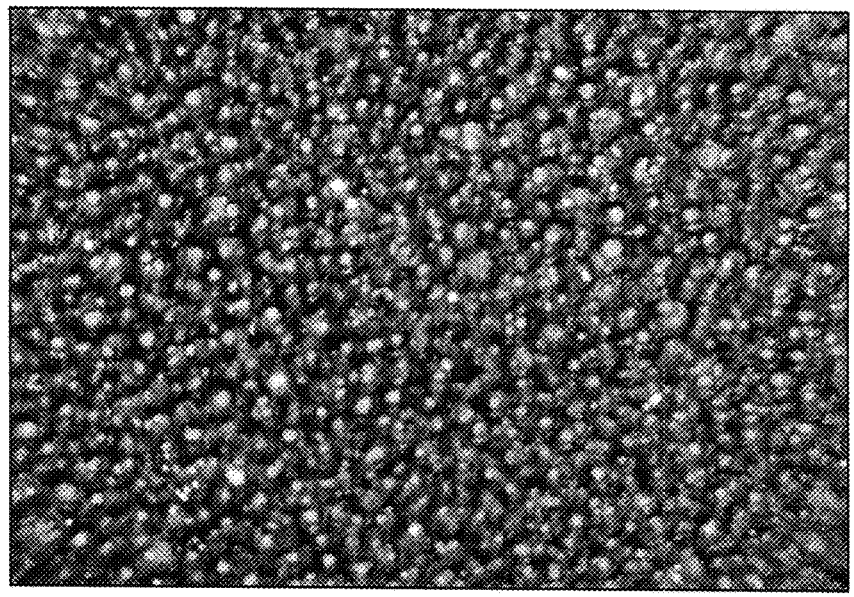
FIG. 3A is a photomicrograph of the PDBP liquid crystal material, referred to herein as PDBP1, having a concentration of about 33% latex in accordance with the concepts of the present invention.
Figure 3B:
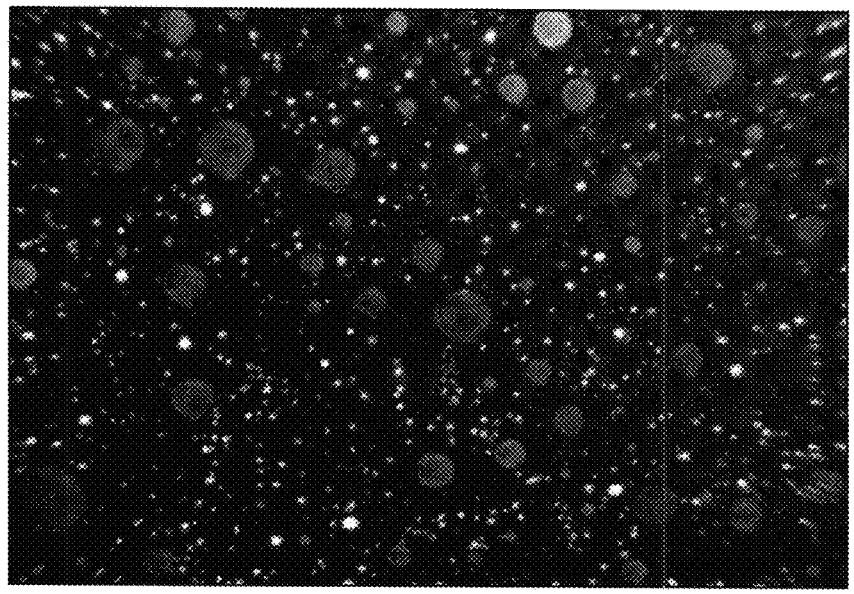
FIG. 3B is a photomicrograph of the PDBP liquid crystal material, referred to herein as PDBP2, having a concentration of about 68% latex in accordance with the concepts of the present invention.

The texture of the PDBP film 10 was evaluated using a polarizing optical microscope and a computer-controlled hot stage. FIGS. 3A and 3B show images of two PDBP films 10 each having different concentrations of polymer latex, which are respectively designated herein as "PDBP1" and "PDBP2". Specifically, the PDBP1 material 10 shown in FIG. 3A, was prepared with a mixture of blue-phase liquid crystals 16 and 33% NEOREZ polymer latex 14, while the PDBP2 material, shown in FIG. 3B, was prepared with a mixture of blue-phase liquid crystals 16 and 68% NEOREZ polymer latex 14. As such, the PDBP1 material 10 and the PDBP2 material 10 had an average droplet 20 size of around 16 µm and 55 µm, respectively. The texture of the dispersed BPLC droplets 20 viewed between a pair of polarizers crossed at 90 degrees showed uniform texture and reflected bluish-green color of the BP I network state at room temperature. The photomicrograph images of FIGS. 3A-B also show droplets 20 formed in clusters resulting from the coalescence of small interconnected droplets or partially merged droplets with the boundary lines that are clearly exhibited across the surface of the droplets for the PDBP1 material 10.

Figure 4:
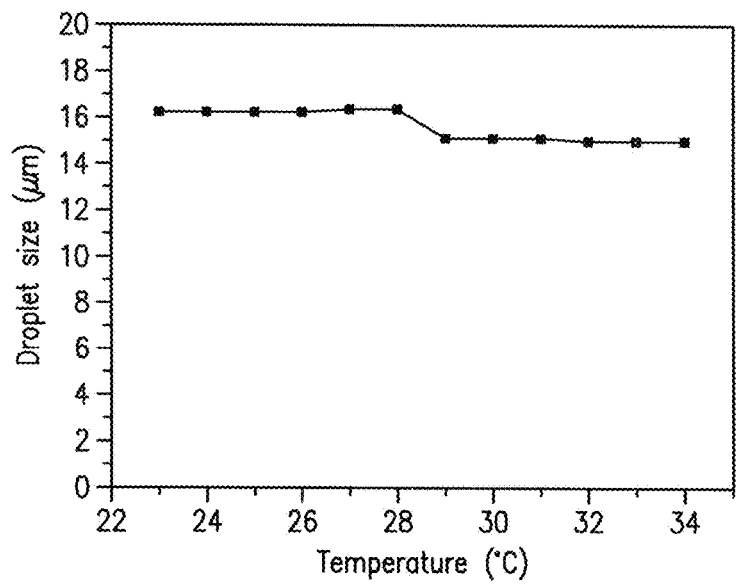
FIG. 4 is a graph showing the size of polymer encapsulated droplets of blue-phase liquid crystals of the PDBP liquid crystal material as temperature changes in accordance with the concepts of the present invention.
Figure 5:
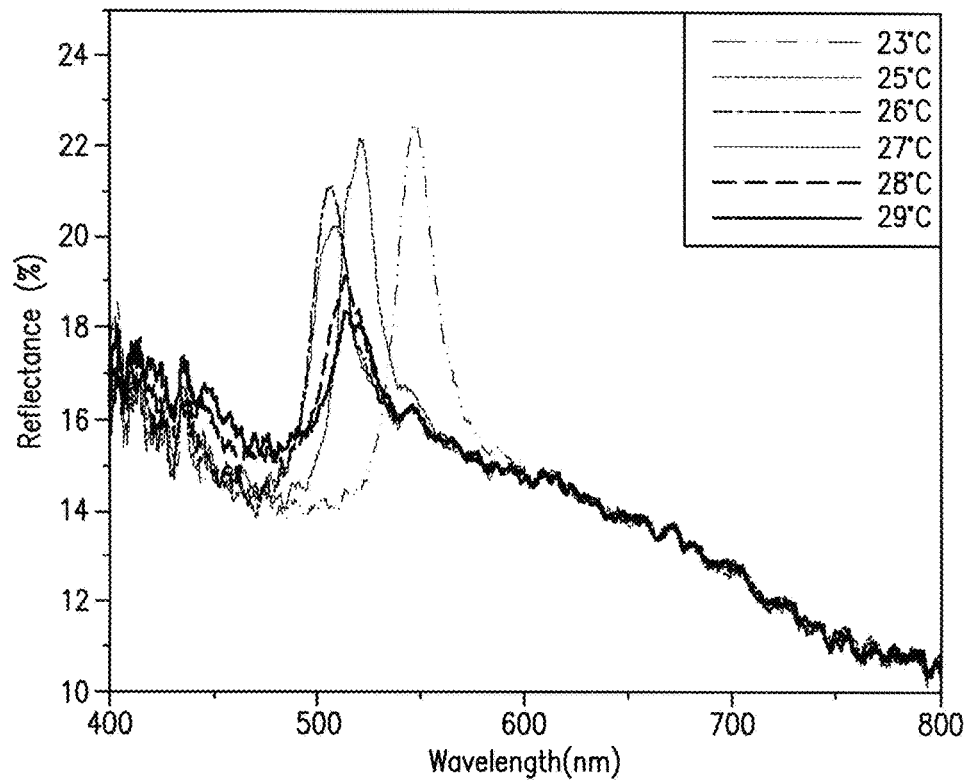
FIG. 5 is a graph showing light reflectance as wavelength changes for various temperatures of the PDBP liquid crystal material in accordance with the concepts of the present invention.

FIG. 4 shows the size of the droplets 20 of the PDBP1 material 10 plotted as a function of temperature. Furthermore, the average size of the droplets 20 was analyzed based on the enlarged photomicrograph images of FIG. 3A with an error bar of approximately +/−3 Clusters of smaller droplets 20 were found to merge and form bigger droplets via thermal treatment, such as from the slow cooling transition from an isotropic temperature to room temperature. The reflection spectra of the droplets 20 was measured with an OCEAN OPTICS spectrometer at various temperatures, such that a plot of the reflectance versus Bragg reflection wavelength at various temperatures for the PDBP1 material 10 is shown in FIG. 5. As a result, a blue shift in reflected wavelength is observed as temperature increases.

Figure 6:
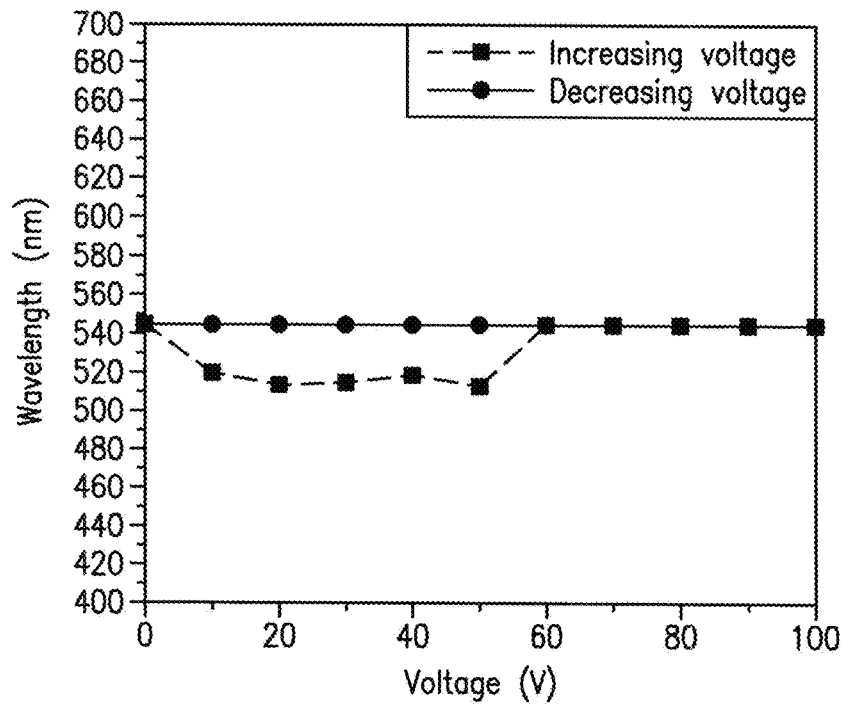
FIG. 6 is a graph showing the reflected wavelength versus applied voltage of the PDBP liquid crystal material in the electro-optical cell with top-down electrodes having a cell gap of about a 22 µm in accordance with the concepts of the present invention.

The electrostriction effect (i.e. field-induced color change) of the electro-optical cell 12 using the PDBP1 material 10 was also evaluated, whereby FIG. 6 shows the plot of reflection wavelength versus the increase in the applied voltage for the polymer-dispersed blue-phase (PDBP) material 10 formed of NEOREZ latex 14 and blue-phase liquid crystals 16 in the electro-optical cell 12 with a top-down electrode 50,52 configuration and an approximate 22 µm cell gap 24 at room temperature. As such, a hysteresis was exhibited in the recovery of the color-reflected state, while the field-induced color change showed a blue shift of up to about 25 nm as the voltage applied to the cell 12 was increased from about 0 V to 50 V; while a red shift in reflected wavelength was observed for voltages above about 60 V. Furthermore, as the applied voltage was decreased, the wavelength shift was found to be negligible.

Figure 7:
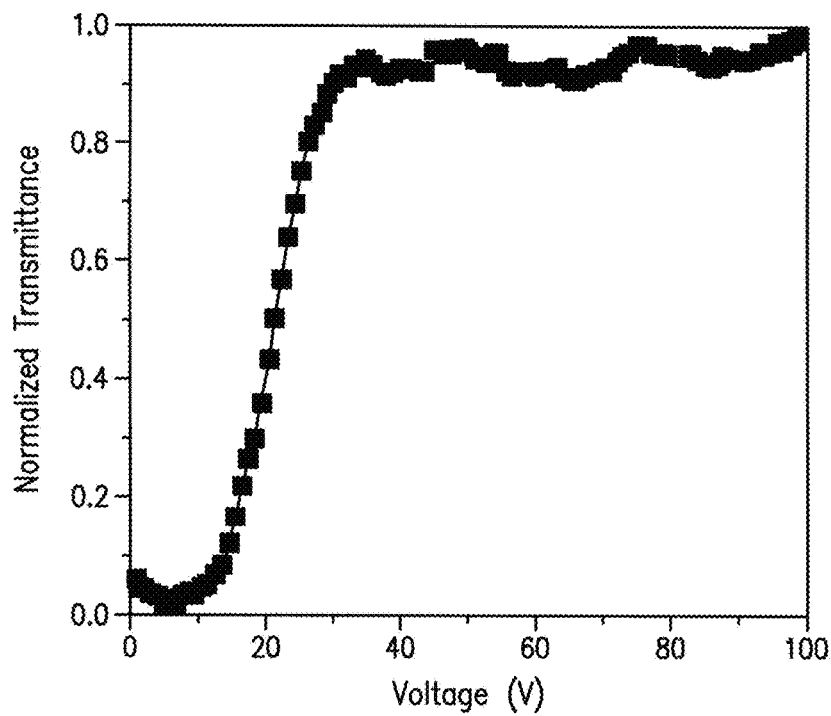
FIG. 7 is a graph showing the normalized light transmittance versus applied voltage of the PDBP1 liquid crystal film with a concentration of about 33% latex in an in-plane-switching (IPS) cell with inter-digitated electrodes on one substrate and no electrodes on the other substrate, and having an about a 15 µm cell gap in accordance with the concepts of the present invention.

The optical Kerr effect of the PDBP1 film or material 10 in the IPS electro-optical cell 12 with a cell gap 24 of approximately 15 µm was also evaluated. In particular, FIG. 7 shows a plot of normalized light transmittance versus applied voltage of the PDBP1 film 10. Specifically, the electro-optical cell 12 was tested with a blue laser (lambda=488 nm), whereby the electro-optical cell 12 was switched from a dark or light-scattering state to a light-transmitting state, whereby the threshold voltage was found to be about 14.6 V and the turn on voltage to be about 31 V, as shown in FIG. 7.

Figure 8:
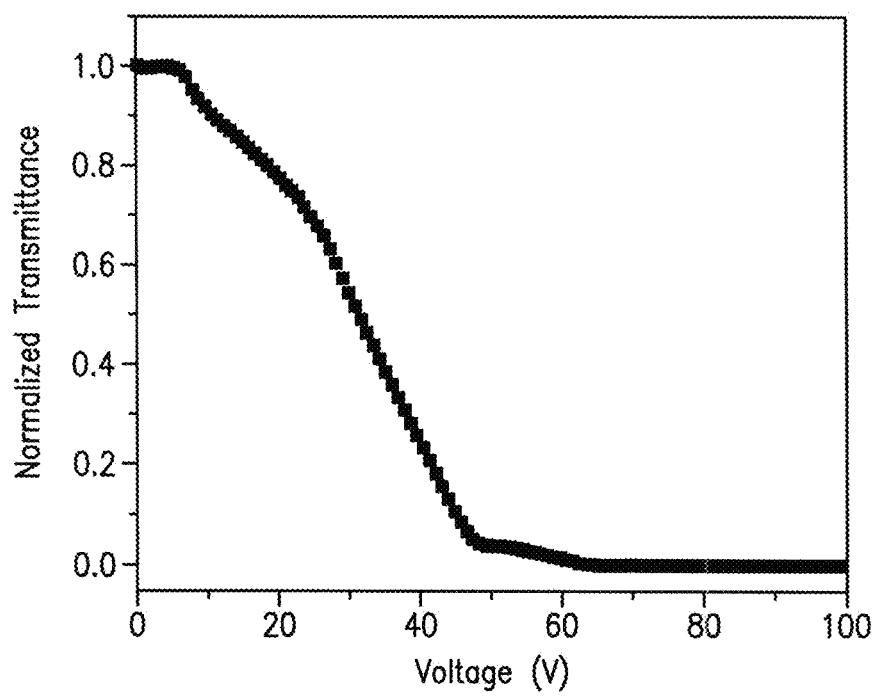
FIG. 8 is a graph showing the normalized light transmittance versus applied voltage of the PDBP2 liquid crystal film with a concentration of about 68% latex (PDBP2) in an IPS cell with about a 22 µm cell gap in accordance with the concepts of the present invention.
Figure 9:
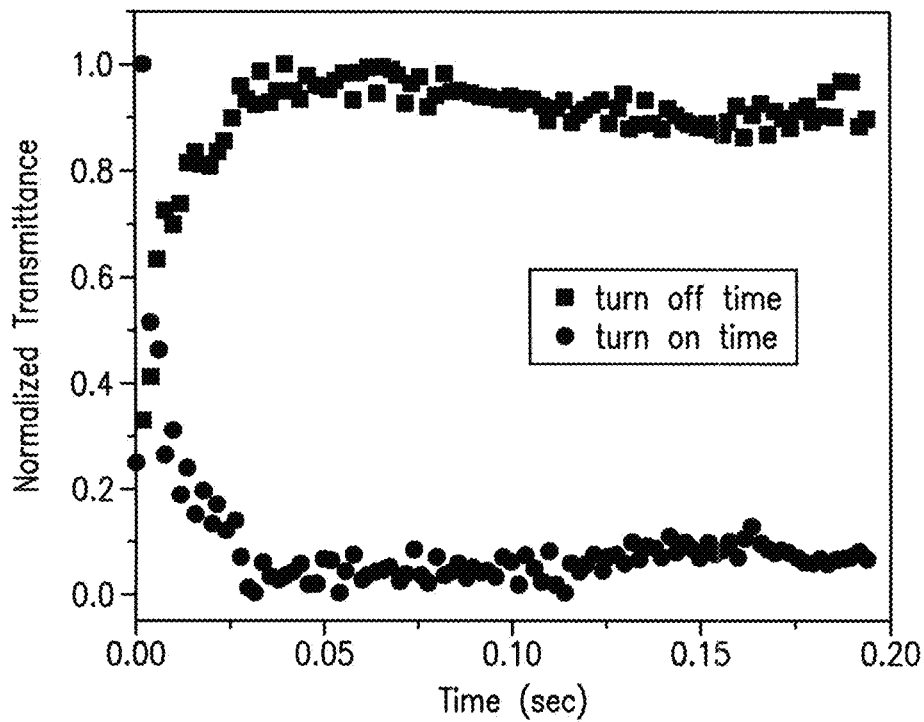
FIG. 9 is a graph showing the response time of the PDBP2 liquid crystal film with a concentration of about 68% latex in accordance with the concepts of the present invention.

FIG. 8 shows a plot of normalized light transmittance versus applied voltage of the PDBP2 material or film 10, whereby the IPS electro-optical cell 12 has a cell gap 24 of about 15 μm and its electrodes 50,52 aligned at approximately 45 degrees between a pair of polarizers crossed at 90 degrees. The threshold voltage was measured as to be about 9.66 V and the turn-on voltage measured to be about 44.8 V for the PDBP2 material 10. In addition, the response time of the PDBP2 material 10 was determined by switching the electro-optical cell 12 between the corresponding voltages of 10% light transmittance ($V_{10}$) and 90% light transmittance ($V_{90}$), as shown in FIG. 9. Specifically, FIG. 9 shows that the response time of the PDBP2 material 10 at about 27° C. achieved a rise time of approximately 144 μs ($\tau_{rise}$, switched between $V_{10}$ and $V_{90}$), and a fall time of about 114 μs, ($\tau_{fall}$, switched between $V_{90}$ and $V_{10}$).

Figure 10:
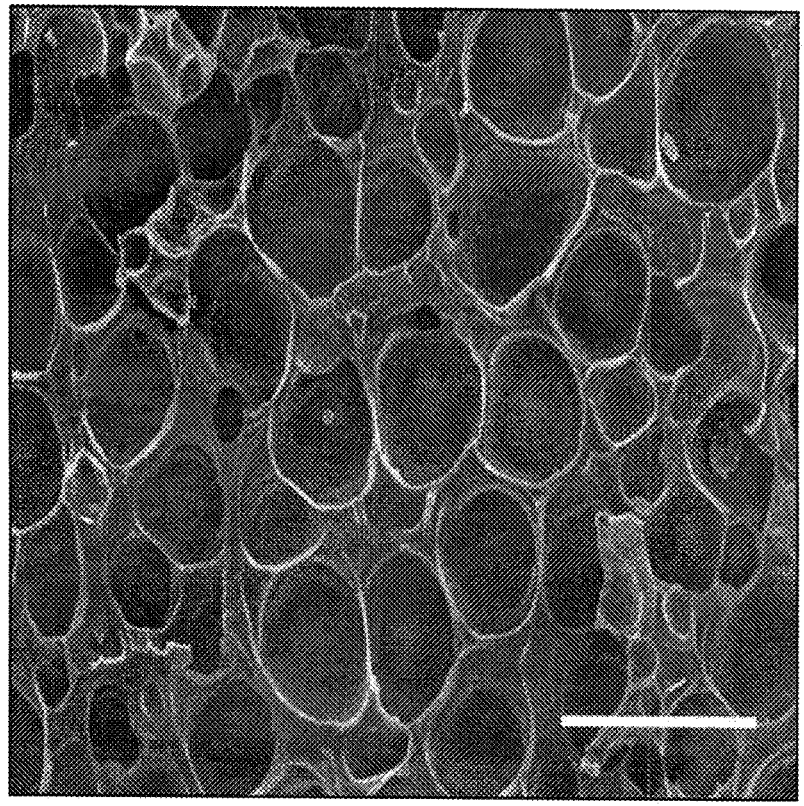
FIG. 10 is a top view SEM (scanning-electron microscope) image of the polymer-dispersed blue-phase (PDBP) liquid crystals in accordance with the concepts of the present invention.
Figure 10A:
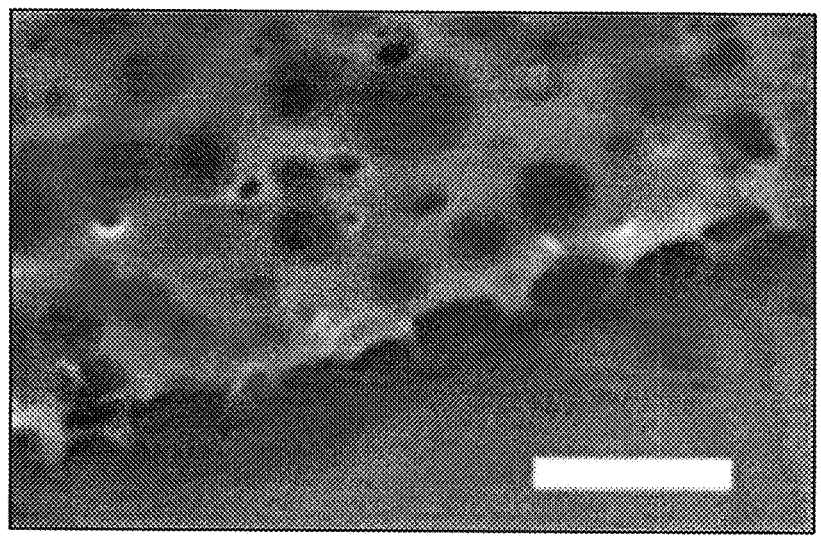
FIG. 10A is a cross-sectional view of the SEM image of the polymer-dispersed blue-phase (PDBP) liquid crystals of FIG. 10 in accordance with the concepts of the present invention.

Continuing, FIG. 10 shows a scanning electron microscope (SEM) image of the PDBP1 material 10 in the electro-optical cell 12. The thickness of the film 10 was about 22 μm. The droplets 20 disposed on the substrate 30 with patterned electrodes 50,52 viewed at the normal angle exhibited two discrete size groups; one group of droplets 20 has an average size of about 10±3 μm, and the other group of droplets 20 had a size of about 50±5 μm, as shown in FIG. 10. The cross-sectional SEM image of the PDBP1 film, shown in FIG. 10A, shows that small droplets 20 are pinned to the substrate 30,40 surface, whereas droplets 20 with size comparable to or larger than the thickness of the film 10 are deformed in the direction parallel to the plane of the film 10. Since NEOREZ is a polyurethane-based latex 14, the strong dipole interactions between the polymer wall and the blue-phase liquid crystal stabilize the droplets 20 against deformation in the case of the electrostriction effect.

In another aspect, the PDBP film or material 10 of the present invention may be prepared by utilizing a polymerization-induced phase separation (PIPS) process. As such, the PDBP film 10 comprises a mixture of optically-transparent photopolymerizable monomer (PN393 sold by Merck), which is mixed with a blue-phase liquid crystals [about 62% nematic eutectic mixture (selected from E31, BL006, MLC 6080, or ZLE 4792 sold by Merck) and about 38% chiral dopant (R-811 sold by Merck)], and a small amount of photoinitiator (Ciba Additive IRGACURE 651). Preferably, the PDBP material 10 formed using the PIPS process includes polymer latex content from about 15% to 90%, while the blue-phase liquid crystal content is in the range of about 85% to 10%. More preferably, the polymer content is in the range of about 20% to 80%, and the blue-phase liquid crystal content is from about 80% to 20%. Thus, a representative mixture for use in the PIPS process may comprise about 34% of a pre-polymer mixture (i.e. photopolymerizable monomer) and about 66% blue-phase liquid crystals. In one aspect, the pre-polymer mixture may include approximately 25% hydroxyl butyl acrylate (HBA sold by Aldrich Chemical) and about 75% photopolymerizable monomer PN393 (sold by Merck).

To carry out the PIPS process, the photopolymerizable monomer/pre-polymer mixture, blue-phase liquid crystals, and photoinitiator were stirred for about two minutes using a vortex mixer. Next, the resultant polymerizable PDBP mixture 10 was disposed in the gap 24 of the electro-optical cell 12. Next, the polymerizable PDBP mixture 10 was exposed to UV (ultraviolet) light (365 nm, 0.6 mW/cm$^2$) for about 30 minutes to polymerize the mixture to form the droplets 20 of PDBP material 10 that includes polymer 14 encapsulated blue-phase liquid crystals 16. The texture of the PDBP material 10 prepared by the polymerization-induced phase separation process created droplets 20 with uniform texture and reflected bluish-green color of the BP I network state at room temperature.

Figure 11:
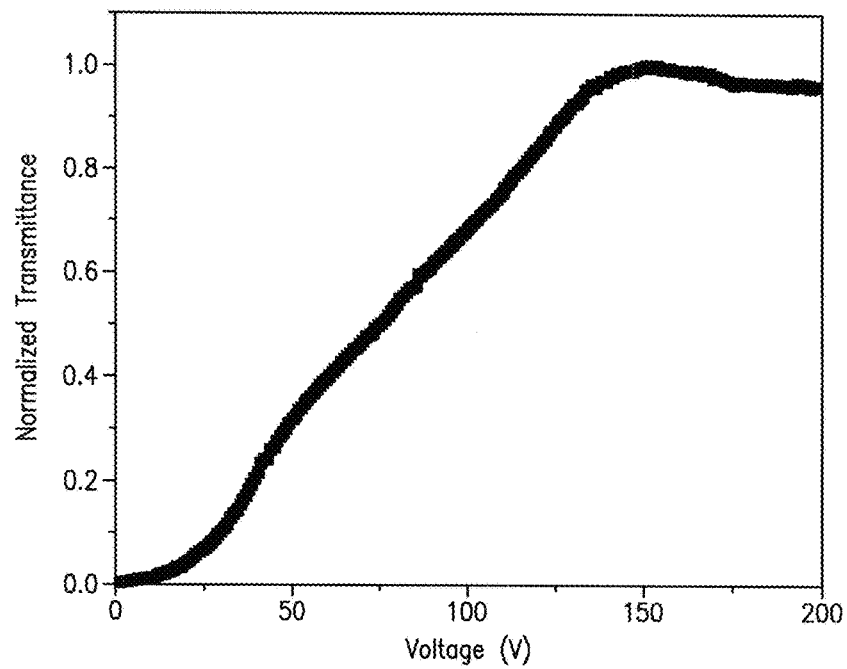
FIG. 11 is a graph showing the normalized light transmittance versus applied voltage of the PDBP liquid crystal film formed using a polymerization-induced phase separation (PIPS) process in accordance with the concepts of the present invention.
Figures 11A, 11B, 11C:
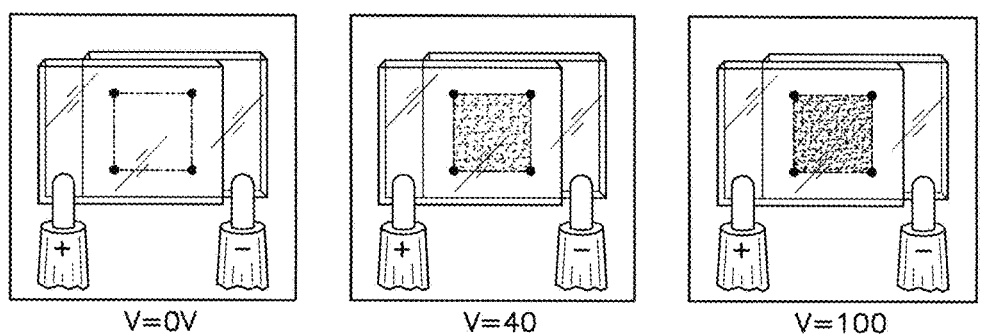
FIG. 11A is a schematic view of the electro-optical cell in accordance with the present invention in a light scattering state in accordance with the concepts of the present invention.
FIG. 11B is a schematic view of the electro-optical cell in accordance with the present invention in a partially light-transmitting state in accordance with the concepts of the present invention.
FIG. 11C is a schematic view of the electro-optical cell in accordance with the present invention in a fully light-transmitting state in accordance with the concepts of the present invention.

FIG. 11 shows a plot of normalized light transmittance versus applied voltage of the PDBP material or film 10 prepared by the PIPS process in the IPS cell 12 with about a 10 μm cell gap 24. As such, the PDBP material or film 10 was evaluated with a blue laser (lambda=488 nm), such that the PDBP material 10 was switched from a light-scattering state, which blocks or occludes the laser light from passing through the film 10, as shown in FIG. 11A, to a light-transmitting state, as shown in FIGS. 11B-C, which together show an increasingly larger amount of the laser light being permitted to pass through the film 10. It should be appreciated that the threshold voltage of the cell 12 is about 30.80 V and the turn on voltage is about 127.0 V.

Figure 12:
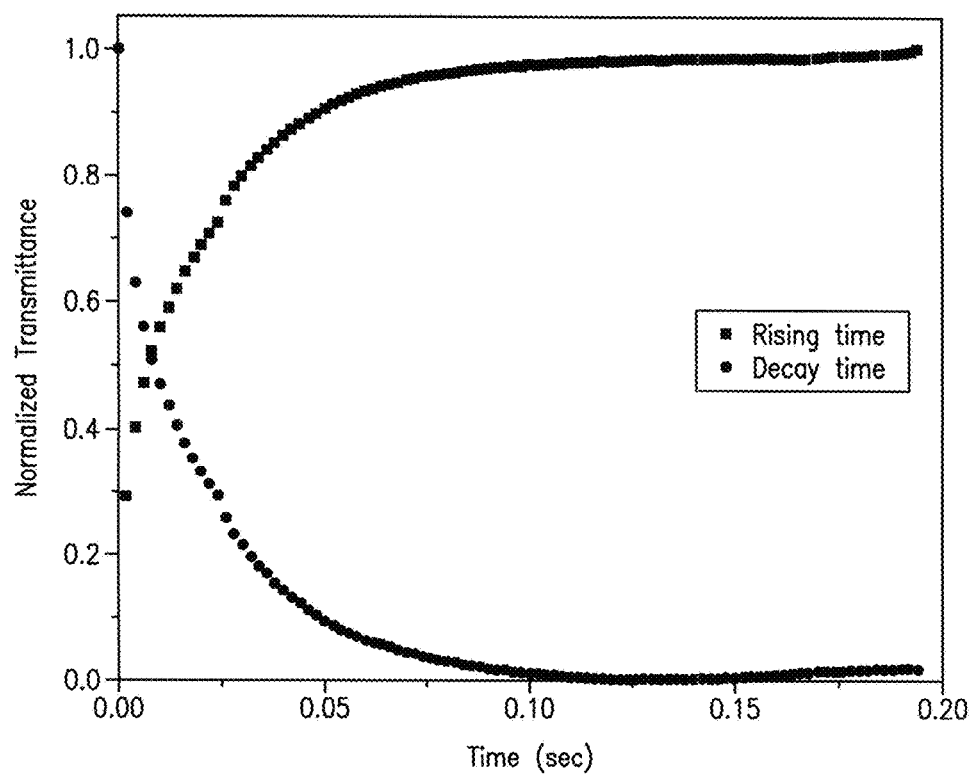
FIG. 12 is a graph showing the response time of the PDBP liquid crystal film formed using the polymerization-induced phase separation (PIPS) process in accordance with the concepts of the present invention.

FIG. 12 shows a plot of response time of the sample, whereby the response time was determined by switching between corresponding voltages $V_{10}$ and $V_{90}$ of the PDBP film formed using the PIPS process at about 23° C. As such, the measured response times of the PDBP material 10 was about 903 μs for the rise time and about 709 μs for the fall time.

In another embodiment, the present invention may embody a liquid crystal device that is formed from a dispersion of polymer stabilized blue phase liquid crystals (i.e blue phase liquid crystal material), in which blue phase liquid crystal droplets are encapsulated in a polymer matrix. The blue phase liquid crystal droplets are formed from a blue phase liquid crystal dispersion, reactive crosslinking monomers and a small amount of a photoinitiator. This composition is mixed with a latex, which includes latex-forming monomers, water, and a surfactant. Upon mixing, the blue phase liquid crystal mixture forms a dispersion within a continuous phase of the latex solution where upon polymerization, partial or fully crosslinked blue phase liquid crystal droplets are formed within a continuous polymer phase upon polymerization of the reactive monomers and evaporation of the water of latex. Polymerization of the reactive monomer inside the droplets stabilizes the blue phase, and enlarges the operating temperature range of blue phase liquid crystals. In accordance with the concepts of the present invention, the device enables fast switching between different field-induced optical states in response to an applied voltage.

The blue phase liquid crystal dispersion of the present invention comprises a latex polymer as the continuous phase in an amount of about 5% to about 90%, desirably from about 5% to about 50%, and preferably from about 5% to about 20% by weight, and a discontinuous phase of the polymer stabilized blue phase liquid crystal droplets from about 95 to about 10 percent, desirably from about 95% to about 50%, and preferably from about 95% to about 80% by weight. Representatively, nematic liquid crystals with low bend to splay elastic constant ratio and high dielectric anisotropy are preferred. Nematic liquid crystals also having a high optical birefringence are useful to enhance the field-induced birefringence to reduce the cell gap and thus, the switching voltage. Chiral dopants with high helical twisting power, i.e. to form short-pitch cholesteric, can be used to reduce the amount of chiral dopant in the mixture to obtain the encapsulated, at least partially crosslinked polymer that contains the blue phase liquid crystals.

For example, any suitable nematic liquid crystal material may be used by the present invention, including MLC6080 (88.5 percent by weight available from Merck), as well as other useful commercially-available nematic liquid crystals, such as those with super-fluorinated nematic mixtures or with large value of dielectric anisotropy including HTG135200-100 (Jiangsu Hecheng Display Technology, CN) for example.

The chiral dopants suitable for forming blue phase liquid crystals of the present invention include R-5011 (about 3% to about 5% by weight), ISO (60BA)$_2$ in amounts from about 7% to about 10% by weight, or R/S-1011 (about 15% to 20% by weight), R/S-811 (about 30% to 50% by weight), CB15 (about 50% to 70% by weight), and ZLI 4752 (from about 10% to about 15% by weight or 11.50%, Merck, or other chiral dopants at desired concentrations, e.g. ISO(60BA)$_2$.

The nematic liquid crystal compositions used by the present invention also include one or more liquid crystal reactive monomers containing mono-functional linear or branched acrylate or methacrylate monomers such as 2-ethyl hexylacrylate (EHA), n-butyl acrylate (BA), 2-epichlorohydrin acrylate (ECA), 2-hydroxy ethylacrylate (HEA), 4-hydroxy butylacrylate (HBA), n-hexyl acrylate (HA), n-decyl acrylate (DA), HFBA (1H,1H heptaflorobutyl acrylate), di-functional monomers such as RM257 (Merck), 1,6-hexanediol diacrylate (HDDA, Aldrich), Bisphenol A-epichlorohydrin acrylate (BAEA), BMATD (1,3-bis(3-methacryloxypropyl)tetramethyldisiloxane), BMATTD (1,3-bis(3-methacryloxypropyl)tetrakis(trimethylsiloxy) disiloxane), bisphenol A-diacrylate (BAD), trifunctional acrylate such as trimethylolpropane triacrylate (TMPTA), pentaerythritol triacrylate (PTA), glyceryl propoxy triacrylate (GPTA), tetraacrylate such as pentaerythritol tetraacrylate (PTTA), di(trimethylolpropane) tetraacrylate (DT-MTA), and pentacrylates such as dipentaerythritol pentaacrylate (DPPA), dipentaerythritol pentaacrylate (DPPTA). Such monomers are di-functional inasmuch as stabilization is obtained by at least partially crosslinking or totally crosslinking the liquid crystal reactive monomers. The amount of such monomers can range from about 3 weight percent to about 40 weight percent, and desirably from about 3 weight percent to about 30 weight percent, and most and desirably from about 3 weight percent to about 15 weight percent based upon the total weight of the one or more nematic liquid crystals.

Another component of the nematic liquid crystal solution utilized by the present invention is the use of one or more photoinitiators to carry out the polymerization of the mono-functional, di-functional and multi-functional monomers. Suitable photoinitiators include benzophenone, benzoin dimethyl ether (Irgacure 651) and other photoinitiators from or similar to those produced by Ciba. The amount of such photoinitiators is small, generally from about 0.02 to about 10 weight percent, and desirably from about 0.02 to about 5 weight percent based upon the total weight of the one or more nematic liquid crystals.

The various nematic liquid crystal solution can be sonicated for about 0.1 to about 2 hours with about 1.5 hours being desired at room temperature in order to obtain a blue phase mixture. A one or more di-functional monomer is then added to the mixture and homogeneously mixed from about 0.1 to about 0.5 hours and desirably for about 1.5 hours. In a specific embodiment, with respect to the total mass of the liquid crystal monomer mixture was 12.5% (7.1% RM 257 and 5.4% HDDA).

The contents of the mixture was sonicated for about 0.1 to about 2 hours with about 1.5 hours being desired at room temperature in order to obtain the blue phase mixture. Then the mixture was homogeneously mixed from about 0.1 to about 2 hours, desirably for about 1.5 hours, after a blend of reactive liquid crystalline di-functional monomers RM257 (Merck) and 1,6-hexanediol diacrylate (HDDA, Aldrich) as well as the small amount (0.5 wt % of reactive monomer mixture) of the photoinitiator (Irgacure 651, Ciba) were added. The concentration of monomers with respect to the total mass of the liquid crystal monomer mixture was about 12.5% (7.1% RM 257 and 5.4% HDDA).

An important aspect of the present invention is the preparation and utilization of a polyvinyl alcohol (PVA) or polymer latex into which the blue phase liquid crystal solution is mixed in order to form the noted droplet size liquid crystal dispersion within the continuous latex solution. The latex solution is prepared from compounds comprising one or more polymers, one or more surfactants, water, and gelatins that serve as crosslinking agents as from Sigma-Aldrich. Examples of suitable surfactants include Sodium dodecyl sulfate, sodium dodecyl benzene sulfonate, Triton-X100, 3M Novec FC-4430, Novec FC-4432 and Novec FC-430. Examples of suitable gelatin crosslinking agents include Triton nonionic surfactants made by Dow, 3M, Rousselot Inc. and Aldrich. The polymers can generally be any polymer that forms a suitable latex and can be prepared from monomers that include one or more urethane monomers, vinyl acetate monomers, vinyl chloride monomers, vinyl alcohol monomers, and the like, with vinyl alcohol monomers being preferred. The surfactants are known to the art as well, and generally may comprise any surfactant that forms a latex.

The latex polymer is prepared by mixing the above components in an ultrasonic mixer at room temperature to form an emulsion.

In order to form the encapsulated polymer stabilized blue phase liquid crystal (PSBPLC) droplets using an emulsification method, a specific example is presented, which relates to utilizing a mixture of 48.5% wt. of blue phase-reactive monomer mixture, which was utilized at three different concentrations of polyvinyl alcohol (PVA, 50,000 g/mol) and 3% surfactant (triton-X100) and gelatin (the chemicals are from Sigma-Aldrich). The emulsified mixtures were heated to about 35° C. for approximately 10 hrs., and the emulsion allowed the solvent (water) to evaporate under reduced pressure at room temperature to reduce the amount of solvent. The compositions of four different emulsions comprising of BPLC, PVA and surfactant are summarized in Table 1 below. For comparison to a control, with regard to the size of the encapsulated droplets, sample 4 contains 3 wt % of gelatin for physical crosslinking the PVA polymer shell.

TABLE 1

Composition of materials of polymer stabilization for polymer dispersed BPLCs.

| | | PVA Latex Solution | | | | |
|---|---|---|---|---|---|---|
| Sample | BPLC Solution (wt. %) | Water (wt. %) | PVA (wt. %) | PVA without H$_2$O (wt. %) | Gelatin (wt %) | Surfactant (Triton-X100) (wt. %) |
| 1 | 48.5 | 41.5 | 7 | 12.6 | 0 | 3 |
| 2 | 48.5 | 36.5 | 12 | 19.8 | 0 | 3 |
| 3 | 48.5 | 45.5 | 3 | 5.8 | 0 | 3 |
| 4 | 48.5 | 38.5 | 7 | 12.6 | 3 | 3 |

Next, a small drop of the emulsion was deposited on a conductive glass substrate and spread with another glass substrate. For electro-optic (EO) cells with a top-down electrodes, the second substrate with a transparent conductive electrode formed of indium-tin-oxide (ITO) was placed on top of the first substrate, whereby the cell gap was maintained at about 15 µm by glass bead spacers deposited between the substrates. The EO cells for achieving an in-plane-switching operation mode were assembled by placing the second substrate (without ITO) on top of first substrate with inter-digitated conductive electrodes patterned by lithography, whereby the cell gap was also maintained at about 15 µm by ball spacers. The EO cells were placed in a vacuum desiccator and under reduced pressure with a vacuum pump at room temperature for one hour to remove residual moisture in the encapsulated film. Polymerizing the encapsulated reactive monomers and blue phase liquid crystal material was carried out by irradiating the EO cells with UV light of about 10 mW/cm$^2$ and wavelength at about 365 nm for approximately 30 minutes at the blue phase temperature on a hot stage temperature controller.

The polymer stabilized blue phase liquid crystal dispersions of the present invention can generally be utilized with respect to any conventional type of liquid crystal display devices. For example, the display can comprise two substrates assembled with transparent conductive electrodes facing each other, a layer of the polymer stabilized blue phase dispersion deposited between the substrates and spacers to maintain a uniform cell gap. In another embodiment, a device cell may comprise two substrates and a layer of blue phase dispersion deposited between the substrates, whereby one substrate has inter-digitated pattern electrodes disposed thereon and the opposite substrate does not have an electrode disposed thereon.

The existence of a continuous polymer phase encapsulating the blue phase liquid crystal droplet essentially amounts to a shell-core structure, with the core being substantially free of any encapsulating (latex) polymer therein. By "substantially free of" is meant that the droplets contain less than about 10 percent by weight or less, desirably less than about 5 percent by weight, preferably less than 1 percent by weight and more preferably, nil, that is no amount of encapsulating or latex polymer within the blue phase liquid crystal droplets.

An advantage of the present invention, as noted above, is that various liquid crystal display devices do not require any surface alignment layer, thus reducing the fabrication and simplifying the process for making a liquid crystal cell or device. Another distinct advantage of the present invention is that the continuous polymer, e.g. a shell, phase containing a discontinuous or core blue phase liquid crystal therein results in an improvement of a polymer stabilized temperature range increase of at least 45° C., desirably at least 50° C., and even about 55° C. or greater. That is, prior to the present invention, a suitable working temperature range of conventional blue phase liquid crystals was only from about 5° C. or 10° C. to about 15° C. However, the present invention has desirably increased the working temperature range from about 20° C. to about 80° C., and desirably from about 25° C. or 30° C. to about 70° C. Still higher temperature working ranges can be achieved by the present invention if small amounts of a non-blue phase nematic liquid crystal is utilized as a host, for example, BL006 made by Merck in amounts of from about 60 to about 88 parts by weight per 100 parts by weight of the polymer and blue phase nematic liquid crystal.

The liquid crystal cells of the present invention may be utilized for wide range applications including, but not limited to, switchable windows, spatial light modulators, active optical elements and gratings, as well as displays on both rigid or flexible substrates. Other advantages of the present invention include good birefringent values, as well as improved Bragg reflection, and the like. All such properties are obtained while maintaining outstanding electro-optical properties, such as fast response time and the fact that no alignment layers are needed for blue phase liquid crystals.

To further enhance the understanding of the present invention to the reader, the following examples are presented, however such examples in no way limit the scope of the invention.

Example 1

Figure 13A:
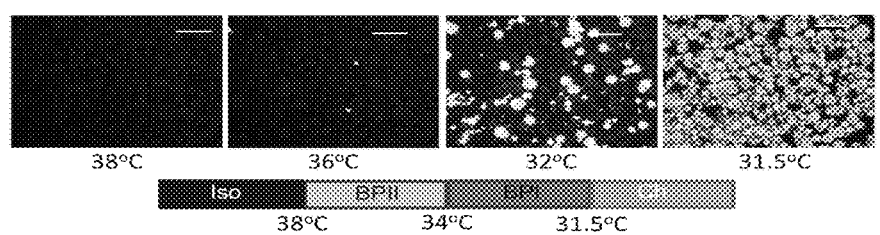
FIGS. 13A-B are micrographs showing POM images and phase sequence of sample 1 A.) before polymerization, and B.) after polymerization (white scalar bar represents 100 µm) in accordance with the concepts of the present invention.
Figure 13B:
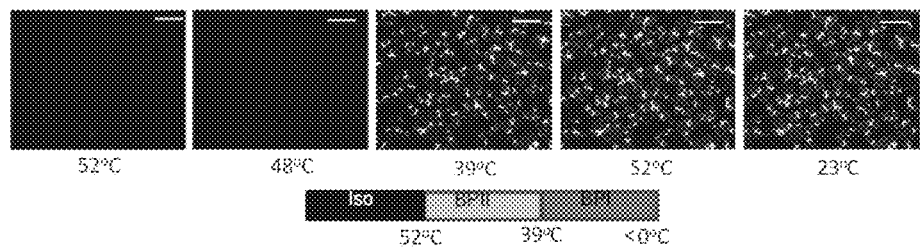

Encapsulated blue phase droplets were identified before and after polymerization by placing the samples under a polarizing optical microscope, equipped with a hot-stage temperature controller, and between crossed polarizers. All samples were heated to the isotropic phase and then cooled to room temperature at a rate of about −0.2° C./min. FIGS. 13A-B show photomicrographs of sample 1 before (FIG. 13A) and after (FIG. 13B) polymer stabilization. The blue phase temperature is found between 40° C. and 32° C. before the polymerization, and the size of the droplets are in the range of between about 30 µm and 100 µm. After the polymerization, the isotropic to blue phase transition temperature is increased to about 55° C., and the droplet size was measured to be between about 20 µm and about 100 µm. After polymerization, it was observed that some of the small droplets were in the cholesteric phase, whereas bigger droplets exhibit the blue phase. With polymer stabilization, strong interactions between the polymer and the BPLCs at the interface of the disclination cores resulted in broadening of blue phase temperature.

The discontinuous blue phase liquid crystal droplet size of the present invention within the continuous polymer phase is generally from about 0.5 microns to 50 microns, desirably from 0.5 microns to about 30 microns, and preferably from about 2.0 microns to about 20 microns.

Example 2

Figure 14:
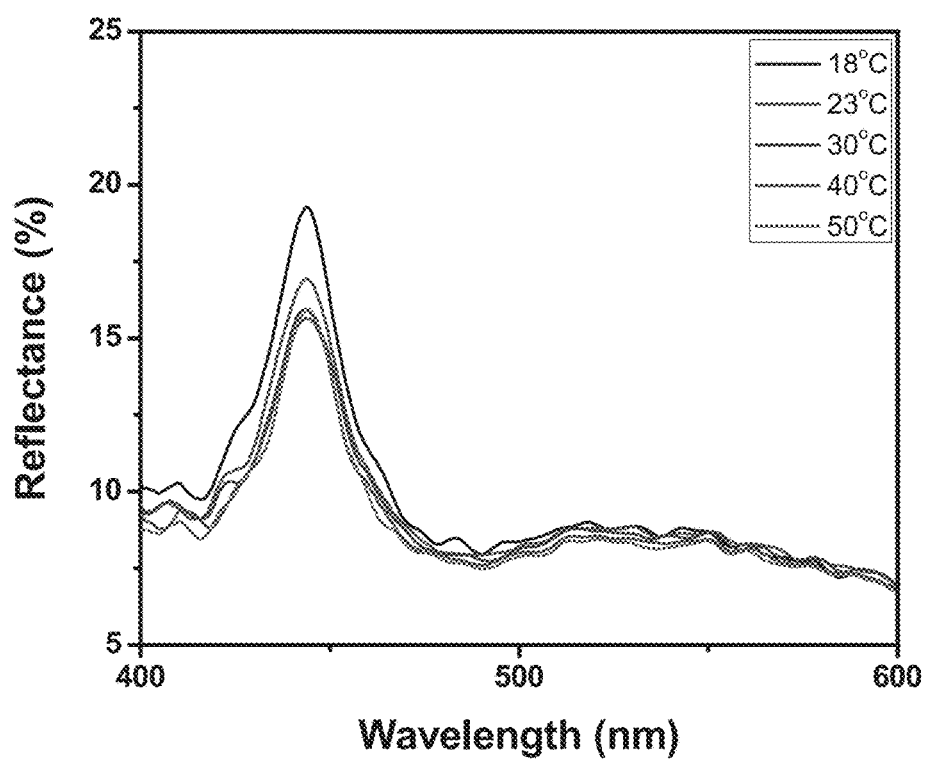
FIG. 14 is a graph showing the reflection spectra of sample 4 illustrating reflectance as a function of temperature ramping in accordance with the concepts of the present invention.

FIG. 14 shows the reflection spectra as a function of temperature of sample 4 with addition of 1% of gelatin. The reflected wavelength of PDBP after polymer stabilization was found independent of temperature ramping up or down. The reflected wavelength appeared at 447 nm and 444 nm for the BPII and BPI. Since sample 4 has more uniform and dense droplets, its Bragg reflectance is intense.

Example 3

The following is an example of test and qualification of the electro-optical (EO) properties of polymer stabilization of PDBP samples using in-plane-switching (IPS) liquid crystal cells. The IPS cells were prepared with one substrate having lithographically-patterned electrodes with a 10-µm electrode line width and 10 µm spacing, while the opposite substrate did not include an electrode. The cell gap between these two substrates was maintained at about 15 µm by ball spacers. The voltage-dependent light transmittance (V-T) curves of the polymer stabilized PDBP (PS-PDBP) cells was measured with an apparatus that included a linearly polarized He—Ne laser light beam passing through a polarizer with optical axis at approximately 0°, whereby the electrode direction of an IPS cell was at an angle of about 45° with respect to the first polarizer, and the optical axis of analyzer was about 90°. Upon application of an electric field, the cell of the encapsulated PS-PDBP sample induced a birefringence. All measurements were performed at room temperature (about 25° C.) controlled by a hot stage. Threshold voltage and turn-on voltages are defined as the voltages which are required for achieving 10% and 90% light transmission in the cell, respectively. The voltage-transmittance curves of four PS-PDBP samples are shown in FIGS. 15A-D.

Figure 15A:
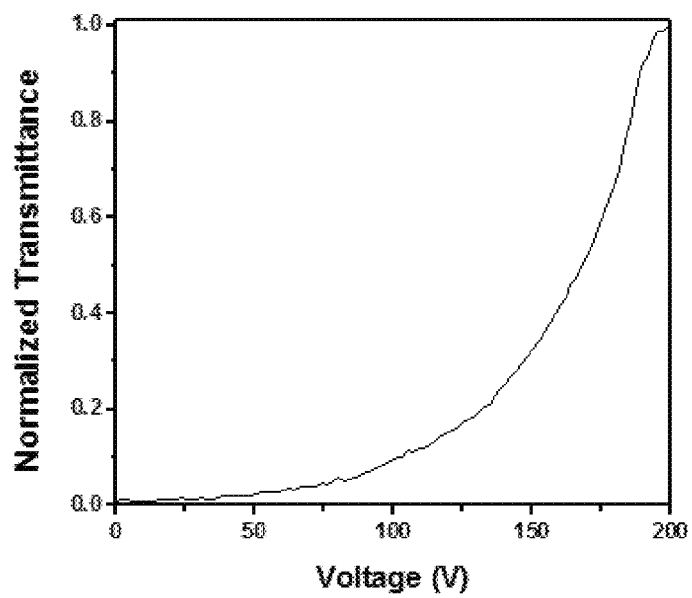
FIGS. 15A-D are graphs showing the voltage dependence of transmission curves of polymer stabilized-polymer dispersed blue phased (PS-PDBP) samples for samples A.) 1, B.) 2, C.) 3, and D.) 4 in IPS cells with a 15 µm cell gap in accordance with the concepts of the present invention.
Figure 15B:
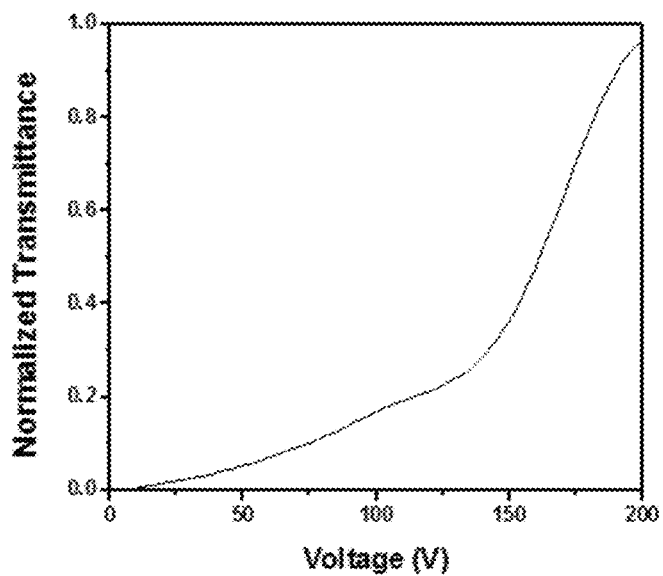
Figure 15C:
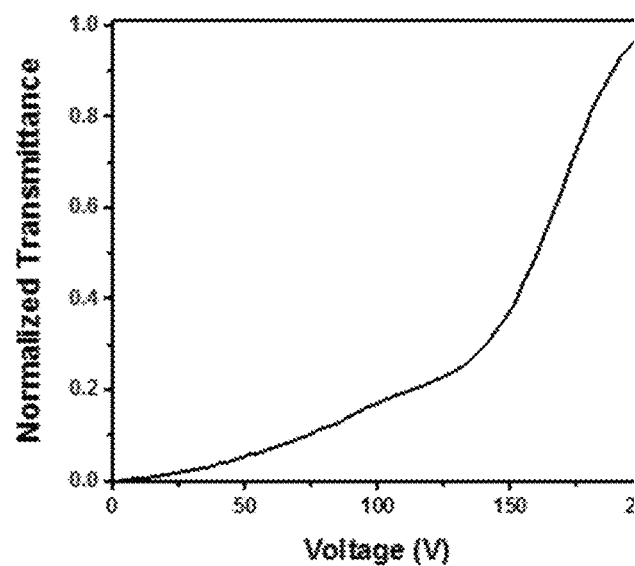
Figure 15D:
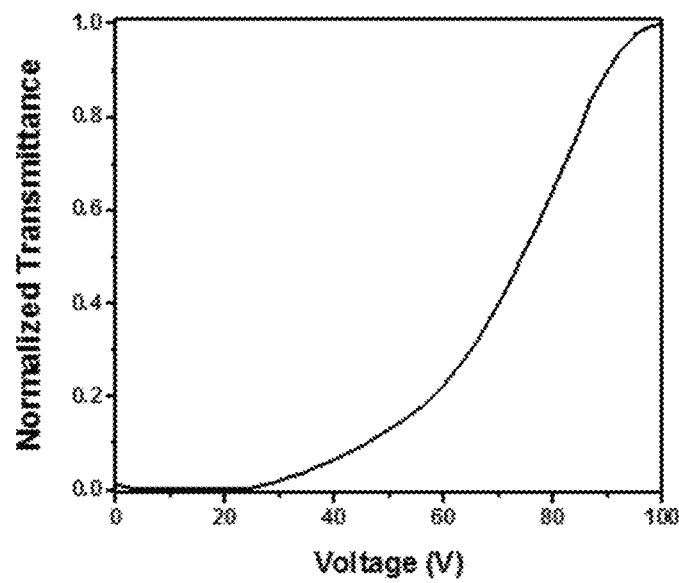
Figure 16:
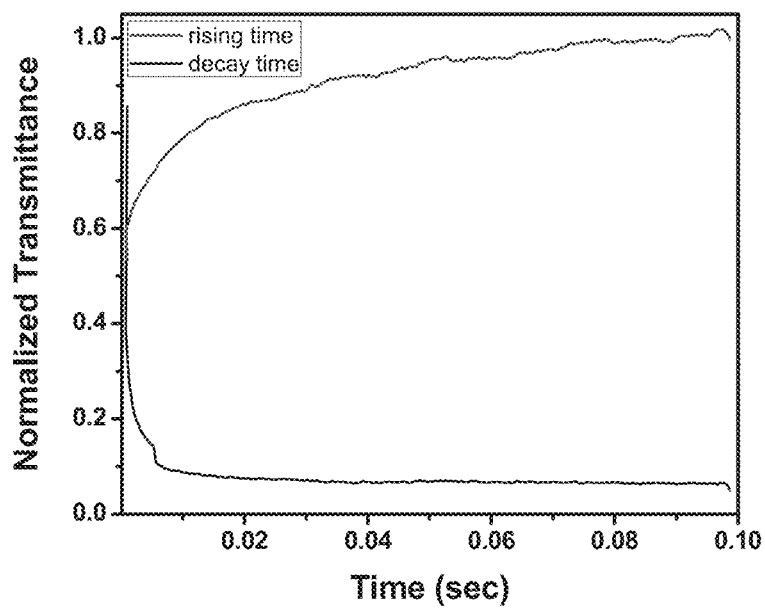
FIG. 16 is a graph showing light transmission versus time curves of rise and decay times of the PS-PDBP sample 4 in an IPS cell with a 22 µm cell gap in accordance with the concepts of the present invention.

For sample 1 (FIG. 15A), the threshold voltage was about 103.5 V, whereas the turn-on voltage is 188 V. The threshold voltages for PS-PDBP samples B and C were 74.5 V and 76 V, respectively. Both the samples 2 and 3 show similar EO features, as shown in FIGS. 15B and 15C. Since these cells include a small amount of focal conic texture, as well as the encapsulated BP droplets with different sizes, the cells appear with both the BP and small amount of focal conic texture at room temperature. Under low applied voltages the transmittance is low. When the voltage is increased above the threshold; the focal conic texture is not stable and changes with time rapidly resulted in an increase in light transmittance. The turn-on voltages of PS-PDBP samples 2 and 3 were 190 V and 192 V, respectively. For the PS-PDBP sample 4, the threshold voltage was 45 V, and the turn-on voltage was 92 V. The reason for the fluctuation in transmittance is because of the large droplet size dispersion. An improved formula can be formulated with either increasing the concentration of gelatin or selecting a different cross-linker for high density crosslinking to achieve mono-dispersed droplet size.

Example 4

The response time of PS-PDBP samples are determined by switching the cells between 10% to 90% transmittance for the rise times and 90% to 10% transmittance for the decay times. The rise time is about 30 ms, while the decay time is about 5 ms. The response time can be further improved by optimizing the mixture allowing the formation of uniform size of polymer dispersed blue phase capsules.

Thus, the present invention provides a liquid crystal display in which a blue phase liquid crystal dispersion is stabilized by polymerizing an effective amount of monomers within the blue phase and encapsulating droplets of the liquid crystal material. The polymer stabilized blue phase liquid crystal dispersions results in wide blue phase temperature range and fast optical Kerr effect in response to an applied voltage.

Therefore, one advantage of the present invention is that a polymer-dispersed blue-phase (PDBP) liquid crystal film exhibits both electro-optical Kerr and electrostriction effects. Another advantage of the present invention is that a PDBP liquid crystal film or material has a blue phase at room temperature. Yet another advantage of the present invention is that a PDBP liquid crystal film or material has reflected color that exhibits minimum changes in response to applying an electric field. Still another advantage of the present invention is that a PDBP liquid crystal film or material may be utilized in a wide range of electro-optical and photonic devices, including LCDs, due to its desirable operating characteristics of field induced birefringence, fast response/switching time between light-scattering and light-transmitting states at low or reduced switching voltages. Yet another advantage of the present invention is that a PDBP liquid crystal film or material may be laminated between rigid, bendable, flexible, or drapeable substrates. Another advantage of the present invention is that a PDBP liquid crystal film or material may be created using an emulsification process or a polymerization-induced phase separation (PIPS) process.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An electro-optical cell comprising:
   a first at least partially-transparent substrate;
   a second at least partially-transparent substrate;
   a light-control layer disposed between said first and second at least partially-transparent substrates, said light-control layer comprising an emulsion of a surfactant, an at least partially transparent latex and a plurality of blue-phase liquid crystals, such that said latex forms a plurality of droplets, whereby at least one of said plurality of droplets encapsulate one or more of said plurality of blue-phase liquid crystals, wherein said surfactant has a concentration of about 3%, said latex is in a continuous phase and has a concentration of about 20%, and said blue-phase liquid crystals have a concentration of about 77% to form a matrix; and
   a first and a second at least partially-transparent electrode disposed on said first at least partially-transparent substrate, said electrodes spaced from each other and positioned adjacent to said light-control layer;
   wherein said light control layer is configured to be placed in a light-scattering state when a first voltage is applied across said electrodes, and configured to be placed in an at least partially light-transparent state when a second voltage is applied across said electrodes, with said first and second voltages being different.

2. The electro-optical cell of claim 1, wherein said first and said second at least one partially-transparent substrates and said first and second at least partially-transparent electrodes are flexible.

3. The electro-optical cell of claim 1, wherein said first and said second at least one partially-transparent substrates are rigid.

4. The electro-optical cell of claim 1, wherein said first and second electrodes are formed of indium-tin-oxide (ITO).

5. The electro-optical cell of claim 1, wherein said first and second electrodes are interdigitated.

6. The electro-optical cell of claim 1, wherein said light-control layer is about 22 um in thickness.

7. The electro-optical cell of claim 1, wherein said latex comprises polyurethane-based latex.

8. The electro-optical cell of claim 1, wherein said latex comprises polyvinyl alcohol (PVA).

9. The electro-optical cell of claim 1, wherein said blue-phase liquid crystal material comprises a mixture of nematic liquid crystals and a chiral dopant.

10. A polymer stabilized blue phase liquid crystal dispersion, comprising:
    a surfactant having a concentration of about 3%;
    a latex combined with said surfactant, said latex in a continuous phase having a concentration of about 20% to form a matrix; and
    a stabilized, at least partially cross-linked nematic blue phase liquid crystal material dispersed and encapsulated within said latex as an emulsion, wherein said blue phase liquid crystal material has a concentration of about 77%;
wherein said blue phase liquid crystal material is in the form of droplets.

11. The polymer stabilized blue phase liquid crystal dispersion of claim 10, having an operating temperature range of between about 20° C. to 80° C.

12. The polymer stabilized blue phase liquid crystal dispersion of claim 10, having an operating temperature range of between about 25° C. to 70° C.

13. The polymer stabilized blue phase liquid crystal dispersion of claim 10, having an operating temperature range of between about 30° C. to 70° C.

14. A liquid crystal display device comprising the stabilized blue phase liquid dispersion of claim 10 therein.

* * * * *